United States Patent
Ellmore et al.

(10) Patent No.: US 11,670,453 B2
(45) Date of Patent: Jun. 6, 2023

(54) ELECTRICAL COMPONENT HAVING LAYERED STRUCTURE WITH IMPROVED BREAKDOWN PERFORMANCE

(71) Applicant: Knowles UK Limited, Norwich (GB)

(72) Inventors: Angela Ellmore, Norwich (GB); James Cockburn, Norwich (GB)

(73) Assignee: Knowles UK Limited, Norwich (GB)

( * ) Notice: Subject to any disclaimer, the term of this patent is extended or adjusted under 35 U.S.C. 154(b) by 0 days.

(21) Appl. No.: 17/369,505

(22) Filed: Jul. 7, 2021

(65) Prior Publication Data

US 2022/0020532 A1 Jan. 20, 2022

Related U.S. Application Data

(60) Provisional application No. 63/054,231, filed on Jul. 20, 2020.

(51) Int. Cl.
  *H01G 4/12* (2006.01)
  *H01C 10/00* (2006.01)
  *H01G 4/30* (2006.01)
  *H01G 4/005* (2006.01)

(52) U.S. Cl.
  CPC .............. *H01G 4/12* (2013.01); *H01C 10/00* (2013.01); *H01G 4/005* (2013.01); *H01G 4/30* (2013.01)

(58) Field of Classification Search
  None
  See application file for complete search history.

(56) References Cited

U.S. PATENT DOCUMENTS

| 1,899,176 | A | * | 2/1933 | Bailey | H01G 4/005 361/275.1 |
| 3,483,450 | A | | 12/1969 | Blickstein | |
| 5,099,387 | A | | 3/1992 | Kato et al. | |
| 5,172,299 | A | * | 12/1992 | Yamada | H01G 4/30 361/321.2 |
| 5,835,338 | A | * | 11/1998 | Suzuki | H01G 4/30 361/321.2 |

(Continued)

FOREIGN PATENT DOCUMENTS

| GB | 2502971 | 12/2013 |
| JP | 2016197645 A | 11/2016 |

(Continued)

OTHER PUBLICATIONS

Britland, Relevant Documents, Great Britain Patent Application GB2110334.6, Concept House, Cardiff Road, Newport South Wales NP108QQ, Dec. 9, 2021.

(Continued)

*Primary Examiner* — Dion R. Ferguson
(74) *Attorney, Agent, or Firm* — Loppnow & Chapa; Matthew C. Loppnow (57) ABSTRACT

An electrical component having a layered structure including first and second electrodes each having first and second electrode portions located in a plane and at least partially embedded in a dielectric body, each of the first and second electrode portions separated by a gap and substantially isolated by the dielectric, the first electrode substantially parallel to and at least partially overlapping the second electrode, wherein the first and second electrodes are electrically isolated and separated by the dielectric body.

15 Claims, 5 Drawing Sheets

(56) References Cited

U.S. PATENT DOCUMENTS

| | | | | |
|---|---|---|---|---|
| 6,052,272 | A * | 4/2000 | Kuroda | H01G 4/385 361/321.1 |
| 6,760,215 | B2 * | 7/2004 | Devoe | H01G 4/35 361/312 |
| 7,027,288 | B2 * | 4/2006 | Shimizu | H01G 4/012 361/329 |
| 7,075,776 | B1 * | 7/2006 | Devoe | H01G 4/385 361/309 |
| 7,133,274 | B2 * | 11/2006 | Hidaka | H01G 4/30 361/311 |
| 7,403,083 | B2 * | 7/2008 | Engel | H01G 4/35 361/328 |
| 7,436,650 | B2 * | 10/2008 | Oguni | H01G 4/012 361/321.1 |
| 7,995,325 | B2 * | 8/2011 | Togashi | H01G 4/012 361/306.3 |
| 8,542,477 | B2 * | 9/2013 | Kim | H01G 4/12 361/321.1 |
| 9,318,263 | B2 * | 4/2016 | Seo | H01G 4/30 |
| 9,847,176 | B2 * | 12/2017 | Albertsen | C04B 35/64 |
| 10,037,838 | B2 * | 7/2018 | Nawai | H01C 1/1413 |
| 10,304,625 | B2 * | 5/2019 | Ellmore | H01G 4/385 |
| 10,741,330 | B1 * | 8/2020 | Trinh | H01G 4/005 |
| 11,094,470 | B2 * | 8/2021 | Kuruma | H01G 4/012 |
| 11,380,491 | B2 * | 7/2022 | Wu | H01G 4/0085 |
| 2007/0195484 | A1 * | 8/2007 | Bultitude | H01G 4/30 361/311 |
| 2008/0084651 | A1 * | 4/2008 | Oguni | H01G 4/012 361/303 |
| 2008/0251285 | A1 | 10/2008 | Sato et al. | |
| 2009/0133252 | A1 * | 5/2009 | Drapkin | H01G 4/232 29/832 |
| 2016/0172109 | A1 | 6/2016 | Kobayashi et al. | |
| 2017/0088471 | A1 | 3/2017 | Randall | |
| 2017/0367186 | A1 | 12/2017 | Park et al. | |
| 2018/0137980 | A1 | 5/2018 | Park et al. | |
| 2019/0385796 | A1 | 6/2019 | Hopwood | |
| 2019/0279824 | A1 * | 9/2019 | Sim | H01G 4/012 |
| 2022/0020532 | A1 * | 1/2022 | Ellmore | H01C 7/18 |

FOREIGN PATENT DOCUMENTS

| | | |
|---|---|---|
| KR | 20160142035 | 12/2016 |
| KR | 20190116171 | 10/2019 |

OTHER PUBLICATIONS

Britland, Patents Act 1977: Examination Report under Section 18(3), Intellectual Property Office, Application No. GB2110334.6, Concept House, Cardiff Road, Newport, South Wales, Sep. 12, 2022.

* cited by examiner

ELECTRICAL COMPONENT HAVING LAYERED STRUCTURE WITH IMPROVED BREAKDOWN PERFORMANCE

TECHNICAL FIELD

The disclosure relates generally to electrical components having a layered structure, like multi-layer ceramic capacitors and varistors among other components, with improved breakdown performance.

BACKGROUND

Multi-layer ceramic capacitors (MLCCs) are commonly used in electric vehicle charging systems and power supplies among a variety of other applications where relatively high voltage, small size and high reliability are paramount. MLCCs generally include interleaved positive and negative electrodes embedded in a ceramic body and electrically coupled to corresponding plated terminations disposed on opposite sides thereof. The ceramic dielectric of such capacitors however is subject to piezoelectric and electrostrictive stress that is known to induce microscopic fissures or cracks that can initiate dielectric breakdown when subjected to a sufficiently high voltage.

The objects, features and advantages of the present disclosure will become more fully apparent to those of ordinary skill in the art upon careful consideration of the following Detailed Description and the appended claims in conjunction with the accompanying drawings described below.

DETAILED DESCRIPTION

The disclosure relates generally to electrical components having a layered structure, like multi-layer ceramic capacitors and varistors among other components, with improved breakdown performance. The electrical components described herein can be configured as surface mount components or as components having leads for through-hole mounting.

In FIGS. 1, 2, 7, 8 and 9, an electrical component 100 having a layered structure generally comprises a dielectric body 110 having first and second end portions, and first and second electrodes at least partially embedded in the dielectric body. The first electrode is parallel to and at least partially overlaps the second electrode in spaced apart relation, wherein the dielectric body electrically isolates the first and second electrodes. Generally, the electrical component can comprise a first plurality of electrodes and a second plurality of electrodes embedded in the dielectric body between the first and second end portions thereof. The first plurality of electrodes are substantially parallel to, and interleaved with, the second plurality of electrodes, wherein the interleaved electrodes form a plurality of at least partially overlapping adjacent electrodes separated and electrically isolated by the dielectric body.

The layered structure comprising the dielectric body and the embedded electrodes constitute an electrical component subassembly and can be manufactured using processes known to those having ordinary skill in the art. Multiple component-sized layered structure subassemblies can be separated from a larger layered structure subassembly block in a dicing or other singulation operation. Before or after singulation, electrical component-specific structures and features can be formed on or assembled with the component-sized layered structure in other fabrication operations also known generally to those having ordinary skill in the art.

In some implementations, the dielectric body comprises a ceramic material. Capacitors, varistors and other electrical components can comprise sintered ceramics as is known generally by those having ordinary skill in the art. Alternatively, the dielectric body can comprise other known and future compositions having dielectric properties and other characteristics suitable for the particular component and use case. The electrodes are conductive and can comprise a base or precious metal as is known generally by those having ordinary skill in the art. Suitable base metals include nickel and copper among others and suitable precious metals include palladium, platinum, gold and silver among other, as well as alloys thereof as is known generally by those having ordinary skill in the art.

Figure 1:
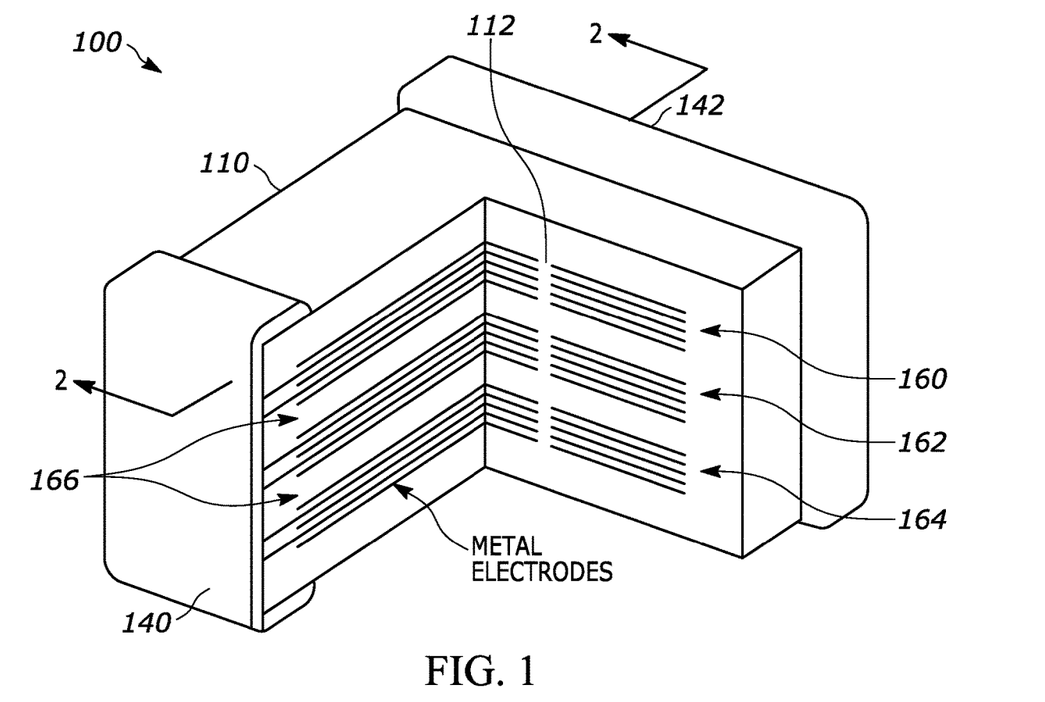
FIG. 1 is a partial sectional view of an electrical component.
Figure 2:
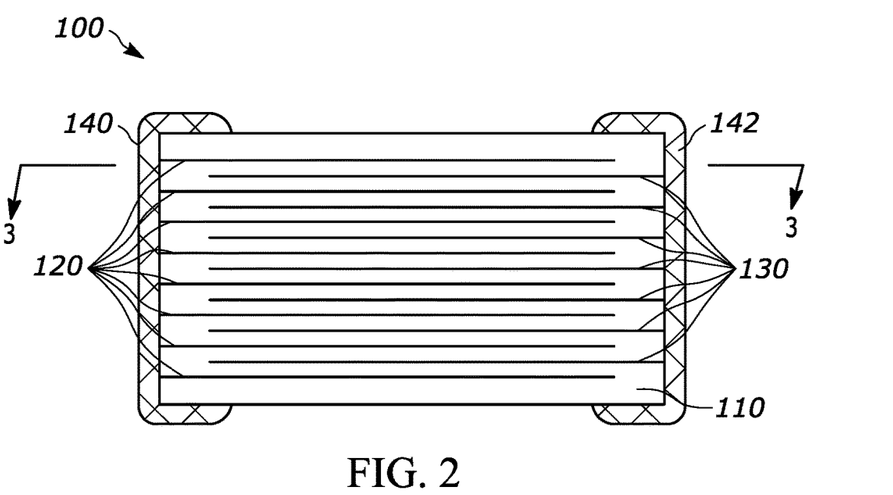
FIG. 2 is a sectional view of the component of FIG. 1.

In FIG. 2, the electrical component 100 comprises a first plurality of electrodes 120 interleaved with and at least partially overlapping a second plurality of electrodes 130 to form an alternating sequence of adjacent electrodes, wherein the dielectric material 110 separates and insulates adjacent electrodes. FIG. 1 shows a different view of a similar structure, among other features described further herein.

In FIGS. 1 and 2, the electrical component also comprises a first conductive termination 140 disposed on the first end portion of the dielectric body 110 and a second conductive termination 142 disposed on the second end portion thereof. The first conductive termination is electrically coupled to the first plurality of electrodes and the second conductive termination is electrically coupled to the second plurality of electrodes. Other electrical components may have different electrical circuit topologies as described further herein. The conductive terminations can comprise a conductive metal, like copper or silver, combined with glass in a sintering process. Alternatively, the conductive terminations can comprise a conductive metal combined with an epoxy. The terminations can also be plated with various metals as is known generally by those having ordinary skill in the art.

According to one aspect of the disclosure, the first electrode comprises a first portion and a second portion located in a common plane and at least partially embedded in the dielectric body between the first and second end portions thereof, wherein the first and second portions of the first electrode are separated by a gap and substantially isolated by the dielectric body. The second electrode similarly comprises a first portion and a second portion located in a common plane and at least partially embedded in the dielectric body between the first and second end portions thereof, the first and second portions of the second electrode are separated by a gap and substantially isolated by the dielectric body. More generally, each of the plurality of first and second electrodes can each comprise corresponding plurality of portions located in a common plane and at least partially separated by a corresponding gap. The one or more gaps between electrode portions constituting each electrode reduces voltage-induced stress in the electrical component. Such stress includes electrostrictive stress and piezoelectric stress (e.g., bending stress) known to induce microscopic fissures or cracks that can initiate dielectric breakdown when subjected to a sufficiently high voltage. Increasing the number of electrode portions constituting the electrodes can improve the breakdown performance.

In some electronic components, all of the electrodes are fully embedded in the dielectric body. In other electronic components, only an inner side of an outermost electrodes can be embedded in or contact the dielectric material. Any electrodes between the outermost electrodes can be fully embedded within the dielectric material.

Figure 3:
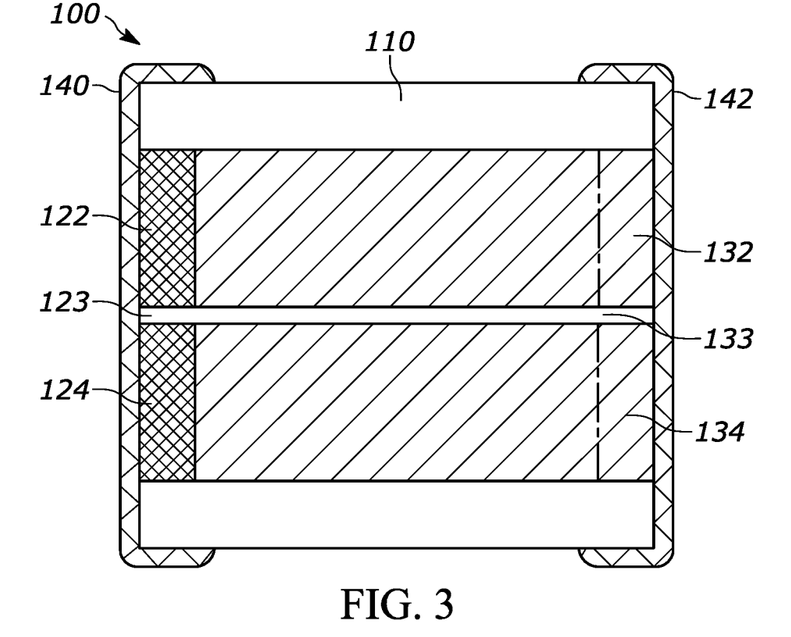
FIG. 3 is a sectional view of the component of FIG. 2.
Figure 4:
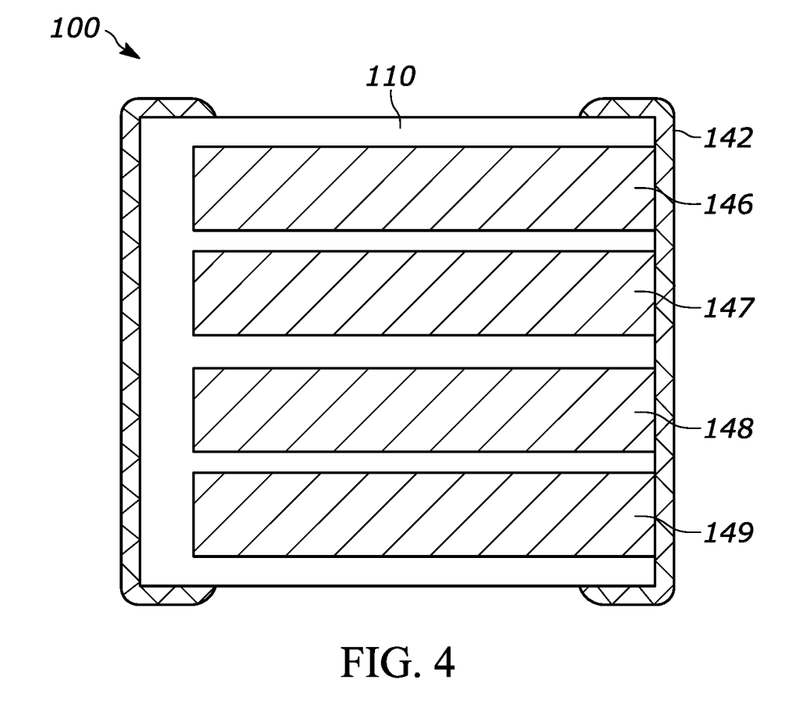
FIG. 4 is a sectional view of an electrical component having an alternative layered structure.
Figure 5:
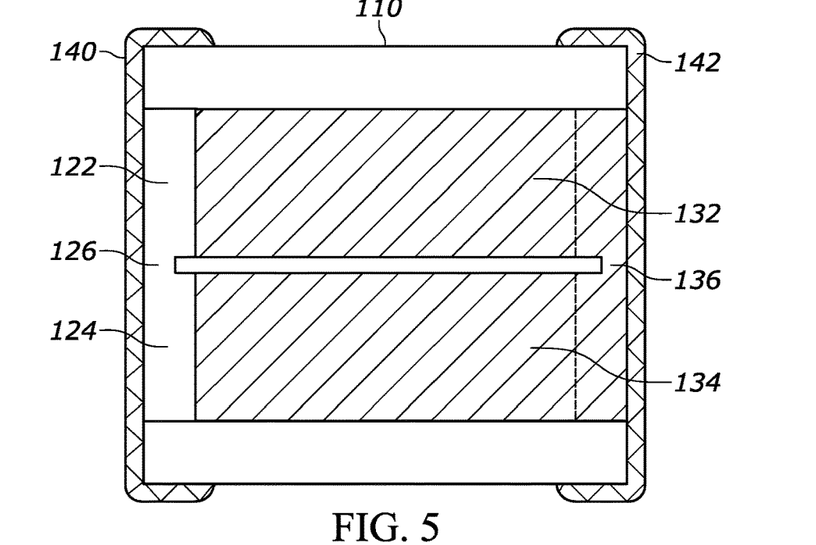
FIG. 5 is a sectional view of electrical component having another alternative layered structure.

In FIG. 1, each electrode of the plurality of first and second electrodes comprise corresponding first and second portions separated by a gap 112. In FIG. 3, an electrode of the first plurality of electrodes comprises a first portion 122 and a second portion 124 separated by a gap 123, and an adjacent electrode of the second plurality of electrodes comprises a first portion 132 and a second portion 134 separated by a gap 133. More generally, each electrode can comprise a plurality of portions at least partially separated by a gap. FIG. 4 shows an electrode comprising a plurality of four discrete electrode portions 146, 147, 148 and 149 located in a common plane and separated by corresponding gaps. Dielectric material 110 fills the spaces (e.g., gaps) between the electrodes. In FIG. 5, a first conductive portion 126 connects the first portion 122 and the second portion 124 of the first electrode and a second conductive portion 166 connects the first portion 132 and the second portion 134 of the adjacent second electrode. Generally, one or more conducting portions may be located anywhere between the constituent electrode portions of some or all of the adjacent electrodes. Offsetting the one or more conductive portions of adjacent electrodes may reduce the electric field intensity and stress associated with these conductive portions. FIG. 5 shows the conductive portion 126 of the first electrode adjacent to the conductive terminal 140 and the conducive portion 136 of the second electrode adjacent the other conductive terminal 142.

Figure 6:
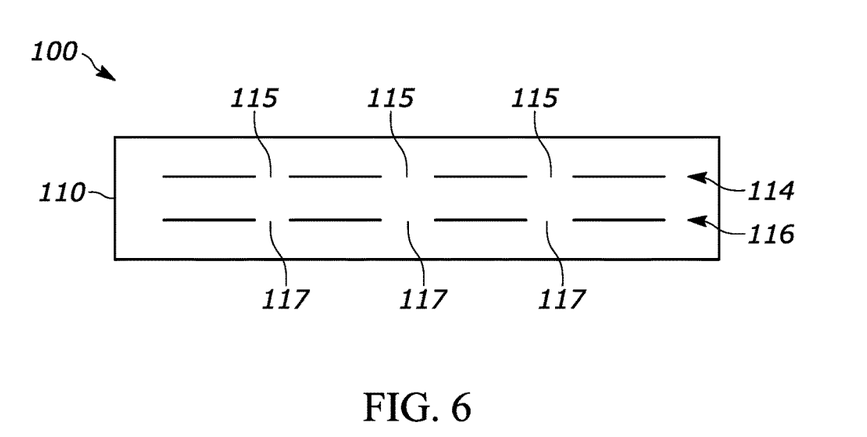
FIG. 6 is a sectional view across a dielectric body of an electrical component having a layered structure.
Figure 7:
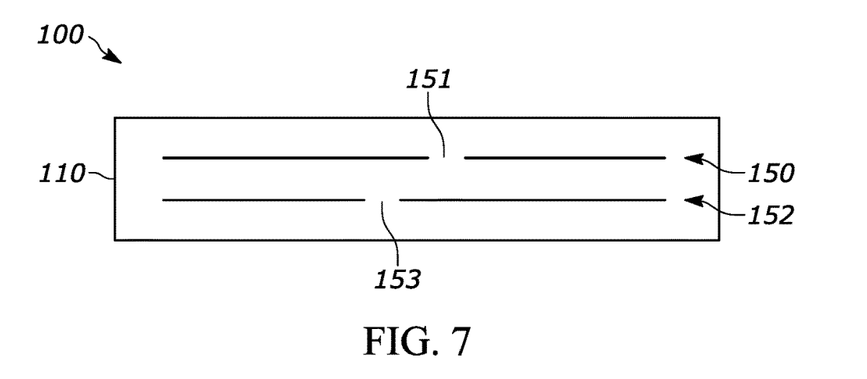
FIG. 7 is a sectional view across a dielectric body of an electrical component having an alternative layered structure.

In FIG. 1, each electrode of the plurality of first and second electrodes comprise corresponding first and second portions separated by a gap wherein the gaps of adjacent electrodes are all aligned as shown at 112. In FIG. 3, the gaps 123 of the first plurality of electrodes are aligned with the gaps 133 of the second plurality of electrodes. FIG. 6 shows first electrode 114 and an adjacent second electrode 116 each having four electrode portions at least partially separated by gaps and located in corresponding common planes, wherein the gaps 115 of the first electrode are aligned with gaps 117 of the second electrode. In electrical components having more than two electrodes, the gaps of other adjacent electrodes can also be aligned. FIG. 7 shows first electrode 150 and an adjacent second electrode 152 each having two electrode portions at least partially separated by gaps and located in corresponding common planes, wherein the gaps 151 of the first electrode are misaligned with gaps 153 of the second electrode. In electrical components having more than two electrodes, the gaps of other adjacent electrodes can also be misaligned.

Electronic components with layered structures can comprise as few as two electrodes and as many as one-hundred or more electrodes, depending on the type of component and the particular use case. The separation or spacing between the electrodes depends generally on the characteristics of the dielectric material, manufacturing process, component size, applied voltage, and use case among other factors. For example, electrical components with a ceramic dielectric for use in 10 V applications typically have a spacing of 5-10 microns. An electrode spacing of 15-50 microns is typical for 500 V applications, and a spacing of 30-100 microns is typical for 1.5 KV applications. These ranges are merely examples and not intended to be limiting since the electrode spacing depends on many factors.

In some implementations, there is a uniform spacing between at least some or all of the plurality of adjacent electrodes of the electrical component. In FIG. 2, there is a common spacing between all adjacent electrodes of the plurality of first and second electrodes 120 and 130. Exemplary dimensions are described further herein. In other implementations, a spacing between some adjacent electrodes is different than a spacing between other adjacent electrodes. In one implementation, the electrical component comprises a plurality of at least two groups of adjacent electrodes, wherein the electrodes in each group are separated by a common spacing. In FIG. 1, for example, the electrical component comprises a first group of electrodes 160, a second group of electrode 162 and a third group of electrodes 164, wherein the adjacent electrodes in each of these groups is separated by a common spacing. FIG. 1 also shows each of the adjacent groups of electrodes separated by a spacing 166 greater than the spacing between adjacent electrodes within each group. The relatively large spacing between adjacent groups of electrodes can further reduce voltage-induced stress on the electrical component when used in combination with gaps between two or more electrode portions constituting each of the electrodes described herein. FIG. 1 shows groups of adjacent electrodes separated by a spacing 166 that is larger than the spacing between adjacent electrodes within each group and the individual electrodes within each group comprising two or more electrode portions separated by a gap 112. As described herein, the gaps between electrode portions of adjacent electrodes can be offset relative to one another.

In some implementations, portions of the dielectric body between adjacent electrodes have homogenous dielectric properties. Thus the dielectric body as a whole can have a homogeneous composition. In other implementations, the portions of the dielectric body between adjacent electrodes can have different dielectric properties. In one implementation, for example, the composition of the dielectric between at least some adjacent electrodes has an open mesh structure with gaseous pockets as disclosed more fully in U.S. Pat. No. 10,304,625. The use of a dielectric body having different properties between some of the adjacent electrodes can be used in combination with other features described herein, including gaps between electrode portions and different spacing between adjacent electrodes or adjacent groups of electrodes.

Figure 8:
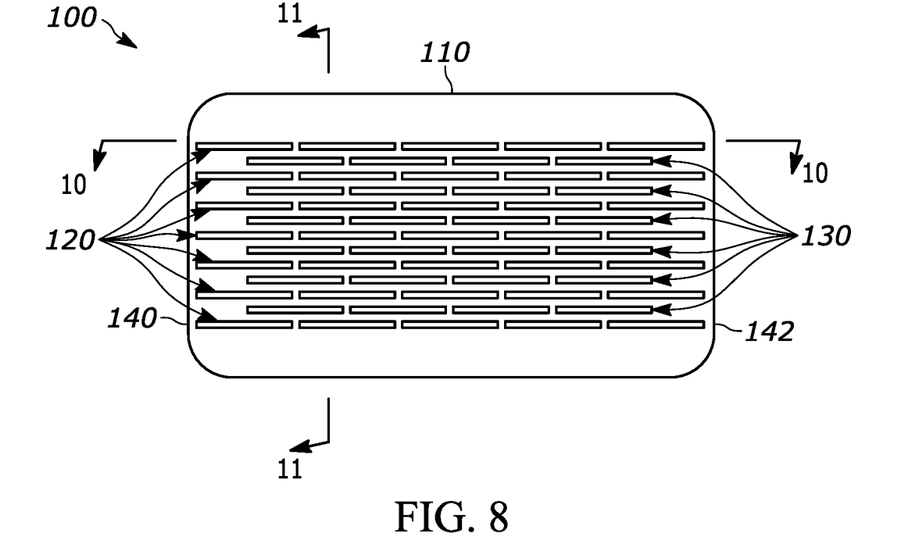
FIG. 8 is a side sectional view of an electrical component having an alternative layered structure.

In FIG. 8, the electrical component 100 also comprises a first plurality of electrodes 120 interleaved with and at least partially overlapping a second plurality of electrodes 130. Each electrode of the first and second plurality of electrodes comprises a plurality of discrete electrode portions disposed in a common plane between the first and second end portions 140, 142 of the body member. The electrodes are arranged so that the discrete electrode portions of adjacent electrodes are offset relative to one another. The first and second plurality of electrodes are embedded in the dielectric body 110, wherein the dielectric body physically separates and electrically isolates the discrete electrode portions. The first plurality of electrodes 120 can be electrically coupled to conductive electrical terminations (not shown) disposed on the first and second end portions 140, 142 of the body members as described herein. Thus configured, the plurality of discrete electrode portions of adjacent electrodes constitute a series of electrically connected capacitors as is known generally.

Figure 9:
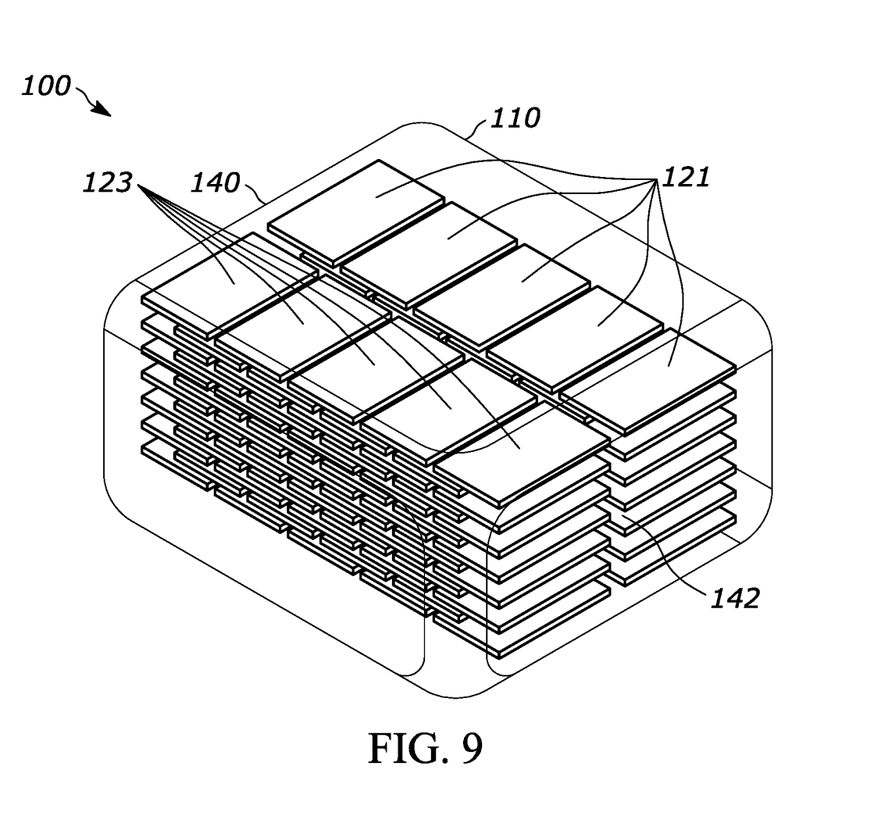
FIG. 9 is a perspective view of the electrical component of FIG. 8.
Figure 10:
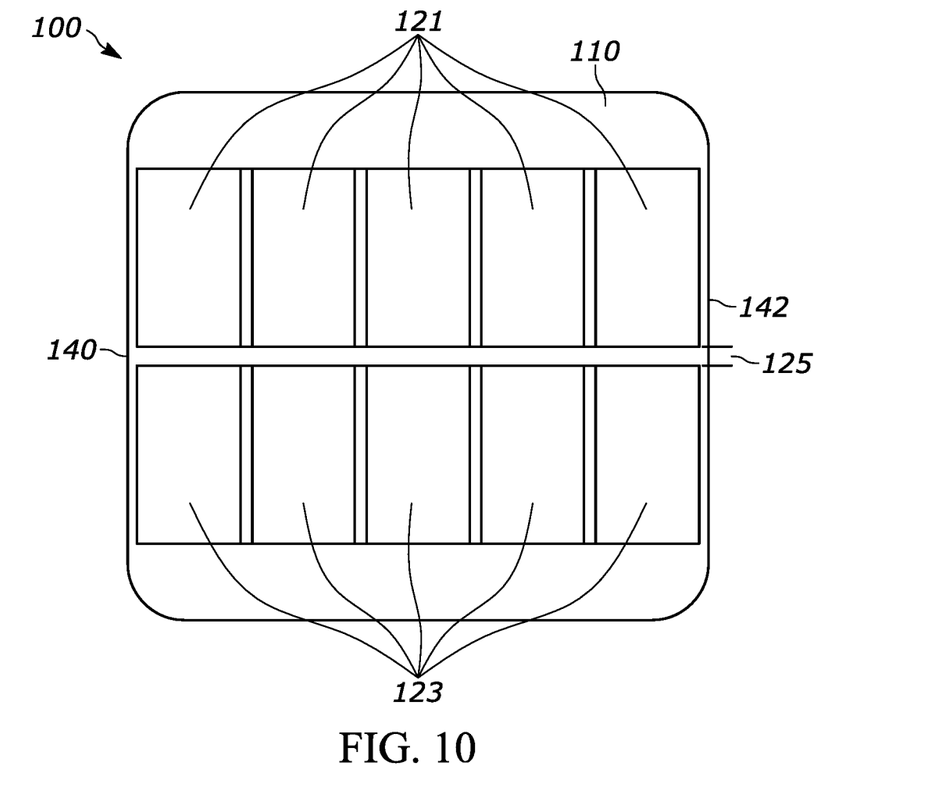
FIG. 10 is a sectional view of the electrical component of FIG. 8.
Figure 11:
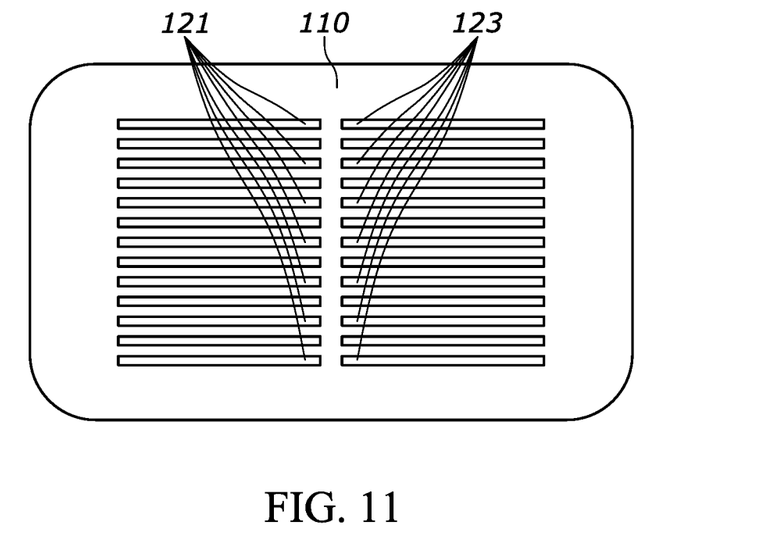
FIG. 11 is a sectional view of the capacitive structure of FIG. 8.

Each of the discrete electrode portions of the electrical component of FIG. 8 can also comprise a plurality of electrode portions separated by a gap as generally described herein with respect to FIGS. 1-7. In FIGS. 9-11, each of the discrete electrode portions constituting the first plurality of electrodes has a first electrode portion 121 separated from a second electrode portion 123 by a gap. Similarly, the discrete electrode portions constituting the second plurality of electrodes can also comprise two electrode portions separated by a gap. More generally, each of the discrete electrode portions of the first and second plurality of electrodes can comprise multiple electrode portions, examples of are described herein and shown in FIGS. 4, 6 and 7. In FIG. 10, the first plurality of electrodes and particularly the discrete electrode portions thereof each comprise a gap 125 aligned with a gap between the discrete electrode portions of the second plurality of electrodes. More generally, in FIGS. 9-11 the gaps separating the electrode portions associated with each electrode can be offset relative to the gaps separating the electrode portions associated with an adjacent electrode, as described herein and shown in FIG. 7. Also, the electrode portions constituting the discrete electrodes in FIGS. 9-11 can be discrete or be connected by one or more conductive portions, as described herein and shown in FIG. 5.

While the present disclosure and what is presently considered to be the best mode thereof has been described in a manner establishing possession by the inventors and enabling those of ordinary skill in the art to make and use the same, it will be understood and appreciated that equivalents of the exemplary embodiments disclosed herein exist, and that myriad modifications and variations may be made thereto, within the scope and spirit of the disclosure, which is to be limited not by the exemplary embodiments described but by the appended claims.

What is claimed is:

1. A capacitor having a layered structure, the capacitor comprising:
    a dielectric body having a first end portion and a second end portion;
    a first conductive termination coupled to the first end portion of the dielectric body;
    a second conductive termination coupled to the second end portion of the dielectric body;
    a first electrode comprising a first portion and a second portion located in a common plane and at least partially embedded in the dielectric body, the first and second portions of the first electrode separated by a first gap and substantially isolated by the dielectric body, each portion of the first electrode comprising a plurality of at least two discrete electrodes isolated from each other by the dielectric body, a first endmost discrete electrode of each portion connected to the first conductive termination, and a second endmost discrete electrode of each portion connected to the second conductive termination;
    a second electrode comprising a first portion and a second portion located in a common plane and at least partially embedded in the dielectric body between the first and second end portions thereof, the first and second portions of the second electrode separated by a second gap and separated from the first and second terminations by the dielectric body, each portion of the second electrode comprising at least one floating electrode; and
    the first electrode substantially parallel to the second electrode, each floating electrode of the first portion of the second electrode at least partially overlapping two discrete electrodes of the first portion of the first electrode, and each floating electrode of the second portion of the second electrode at least partially overlapping two discrete electrodes of the second portion of the first electrode.

2. The capacitor of claim 1, wherein the dielectric body comprises a ceramic material, and the first and second electrodes each comprise a base metal or a precious metal.

3. The capacitor of claim 2, wherein the first and second terminations each comprise a sintered glass and metal composition or a cured epoxy and metal composition.

4. The capacitor of claim 3, wherein the first and second terminations each comprise a metal plating.

5. The capacitor of claim 1, wherein the first gap in the first electrode is offset relative to the second gap in the second electrode.

6. The capacitor of claim 1, wherein the dielectric body electrically isolates the first and second portions of the first electrode, and the dielectric body electrically isolates the first and second portions of the second electrode.

7. An electrical component having a layered structure comprising:
    a dielectric body having a first end portion and a second end portion;
    a first plurality of electrodes embedded in the dielectric body between the first and second end portions thereof, each of the first plurality of electrodes comprising a first portion and a second portion located in a common plane, the first and second portions of each of the first plurality of electrodes separated by a gap and substantially isolated by the dielectric body; and
    a second plurality of electrodes embedded in the dielectric body between the first and second end portions thereof, each of the second plurality of electrodes comprising a first portion and a second portion located in a common plane, the first and second portions of each of the second plurality of electrodes separated by a gap and substantially isolated by the dielectric body,
    the first plurality of electrodes substantially parallel to, and interleaved with, the second plurality of electrodes, the interleaved electrodes forming a plurality of at least partially overlapping and adjacent electrodes separated and electrically isolated by the dielectric body,
    each electrode of the first plurality of electrodes comprising a plurality of discrete electrodes in a common plane, each of the discrete electrodes comprising a first electrode portion separated from a second electrode portion by a gap and isolated by the dielectric body,
    each electrode of the second plurality of electrodes comprising a plurality of discrete electrodes in a common plane, each of the discrete electrodes comprising a first electrode portion separated from a second electrode portion by a gap and isolated by the dielectric body, the discrete electrode portions of adjacent electrodes offset relative to one another, and the electrical component further comprising:

a first conductive termination coupled to the first end portion of the dielectric body, the first conductive termination electrically coupled to the first and second electrode portions of a first endmost discrete electrode of each of the first plurality of electrodes; and a second conductive termination coupled to the second end portion of the dielectric body, the second conductive termination electrically coupled to the first and second electrode portions of a second endmost discrete electrode of each of the first plurality of electrodes, wherein the discrete electrode portions of adjacent electrodes form a series of capacitors between the first conductive termination and the second conductive termination.

8. The electrical component of claim 7, wherein the dielectric body comprises a ceramic material, and the first and second plurality of electrodes each comprise a base metal or a precious metal.

9. The electrical component of claim 8, wherein the first and second terminations each comprise a sintered glass and metal composition or a cured epoxy and metal composition.

10. The electrical component of claim 7, wherein the gaps of adjacent electrodes are offset.

11. The electrical component of claim 7, wherein a dielectric composition of the dielectric body between some adjacent electrodes is different than a dielectric composition of the dielectric body between other adjacent electrodes, wherein the dielectric composition between the other adjacent electrodes has an open mesh structure with gaseous pockets.

12. The electrical component of claim 10 further comprising a uniform spacing between the plurality of adjacent electrodes.

13. The electrical component of claim 7, wherein a spacing between some adjacent electrodes is different than a spacing between other adjacent electrodes.

14. The electrical component of claim 13, wherein the adjacent electrodes comprise a first group of adjacent electrodes separated by a first spacing and a second group of adjacent electrodes separated by the first spacing, the first group of electrodes separated from the second groups of electrodes by a second spacing different than the first spacing.

15. The electrical component of claim 14, wherein the dielectric body has a homogenous dielectric composition.

\* \* \* \* \*